(12) United States Patent
Yuki et al.

(10) Patent No.: US 7,778,553 B2
(45) Date of Patent: Aug. 17, 2010

(54) OPTICAL TRANSMITTER

(75) Inventors: Masahiro Yuki, Kawasaki (JP); Kentaro Nakamura, Kawasaki (JP); Hiroki Ooi, Kawasaki (JP); Masato Nishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 11/599,277

(22) Filed: Nov. 15, 2006

(65) Prior Publication Data

US 2007/0264028 A1 Nov. 15, 2007

(30) Foreign Application Priority Data

May 9, 2006 (JP) ............... 2006-130361
Sep. 15, 2006 (JP) ............... 2006-251157

(51) Int. Cl.
*H04B 10/04* (2006.01)
(52) U.S. Cl. ............... 398/183; 398/188; 398/193; 398/194; 398/195; 398/196; 398/197; 398/198
(58) Field of Classification Search ............... 398/183, 398/184, 185, 186, 187, 188, 189, 190, 191, 398/192, 193, 194, 195, 196, 197, 198, 199, 398/200, 201, 154, 155, 158, 159
See application file for complete search history.

(56) References Cited

U.S. PATENT DOCUMENTS

| | | | | |
|---|---|---|---|---|
| 6,972,842 | B2 * | 12/2005 | Doerr et al. | ............... 356/364 |
| 7,447,443 | B2 * | 11/2008 | Bai | ............... 398/183 |
| 2002/0080817 | A1 * | 6/2002 | Glingener et al. | ............ 370/465 |
| 2003/0175037 | A1 * | 9/2003 | Kimmitt et al. | ............. 398/198 |
| 2004/0081470 | A1 | 4/2004 | Griffin | |
| 2005/0002675 | A1 * | 1/2005 | Sardesai et al. | ............. 398/183 |
| 2006/0088321 | A1 * | 4/2006 | Cheung et al. | ............. 398/195 |

FOREIGN PATENT DOCUMENTS

| | | |
|---|---|---|
| JP | 2002-353896 | 12/2002 |
| JP | 2004-516743 | 6/2004 |

OTHER PUBLICATIONS

O. Vassilieva et al., "Non-Linear Tolerant and Spectrally Efficient 86 Gbit/s RZ-DQPSK Format for a System Upgrade", OFC 2003.
T. Hoshida et al., "Optimal 40 Gb/s Modulation Formats for Spectrally Efficient Long-Haul DWDM Systems", Journal of Lightwave Technology, vol. 20, No. 12, pp. 1989-1996.

* cited by examiner

*Primary Examiner*—Hanh Phan
(74) *Attorney, Agent, or Firm*—Fujitsu Patent Center

(57) ABSTRACT

In an optical transmitter of the invention, continuous light from a light source is a (CS)RZ-D(Q)PSK modulated by two optical modulators connected in series, and a part of the optical signal output from a post-stage optical modulator is branched by an output monitor section, and the power of a preset frequency component, excluding a frequency component corresponding to a baud rate, included in an electrical spectrum acquired by photoelectrically converting the branched beams is measured. The relative phase of drive signals applied to the optical modulators is then feed-back controlled so that the power becomes a minimum. As a result, a delay shift due to a temperature change or the like between drive signals applied to respective optical modulators, can be reliably compensated.

13 Claims, 14 Drawing Sheets

OUTPUT WAVEFORM OF RZ-DQPSK SIGNAL LIGHT
(WHEN RZ SIDE IS DELAYED WITH RESPECT TO DQPSK SIDE)

Delay: 0ps  +6ps

+11ps  +17ps

+22ps

OUTPUT WAVEFORM OF RZ-DQPSK SIGNAL LIGHT
(WHEN RZ SIDE IS ADVANCED WITH RESPECT TO DQPSK SIDE)

Delay: 0ps

−6ps

−11ps

−17ps

−22ps

ELECTRICAL SPECTRUM OF RZ-DQPSK SIGNAL LIGHT
(WHEN RZ SIDE IS DELAYED WITH RESPECT TO DQPSK SIDE)

Delay : +0ps

+6ps

+11ps

+17ps

+22ps

ELECTRICAL SPECTRUM OF RZ-DQPSK SIGNAL LIGHT
(WHEN RZ SIDE IS ADVANCED WITH RESPECT TO DQPSK SIDE)

Delay : 0ps

−6ps

−11ps

−17ps

−22ps

POWER CHANGE OF 44 GHz COMPONENT

POWER CHANGE OF 100 MHz COMPONENT

POWER CHANGE WHEN USING LPF AND CAPACITOR

POWER CHANGE WHEN USING LPF

RELATED ART (CS) RZ-DPSK MODULATION FORMAT

CONFIGURATION EXAMPLE OF 43 Gb/s (CS) RZ-DQPSK MODULATION FORMAT (CS) RZ-DQPSK MODULATION FORMAT 43G (CS)RZ-D(Q)PSK MODULATION UNIT

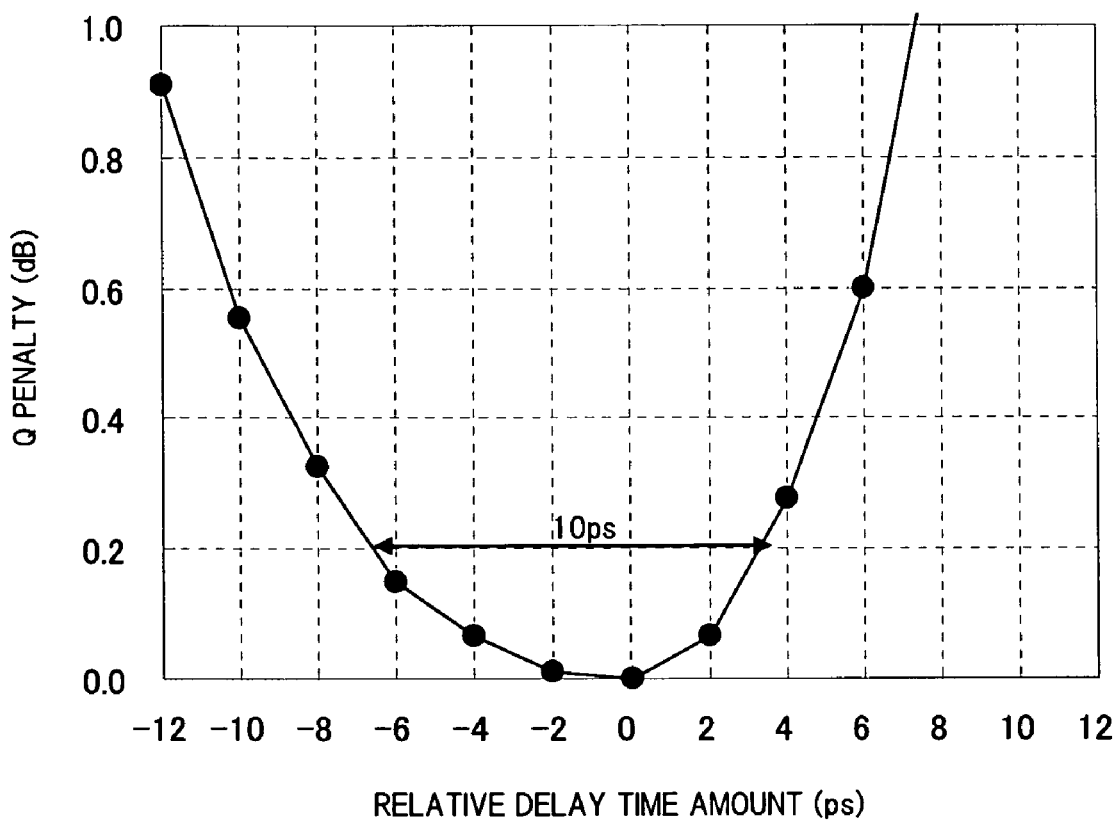

OPTICAL TRANSMITTER

BACKGROUND OF THE INVENTION

1. Field of the Invention

The present invention relates to an optical transmitter that transmits pulsed multivalue phase-modulated light, and more specifically, relates to an optical transmitter capable of compensating a phase shift due to a temperature change or the like between drive signals, respectively applied to a plurality of serially connected light modulation sections.

2. Related Art

Recently, demand for the introduction of a next generation 40 Gbit/s optical transmission system has increased, and transmission distance and frequency efficiency equivalent to those of a 10 Gbit/s system are also required. As a means for realizing this, research and development of Return to Zero-Differential Phase Shift Keying (RZ-DPSK) modulation or Carrier Suppressed Return to Zero-Differential Phase Shift Keying (CSRZ-DPSK) modulation, which are excellent in optical signal-to-noise ratio (OSNR) resistance and nonlinearity resistance as compared with a Non Return to Zero (NRZ) modulation format conventionally applied to the 10 Gbit/s systems or below, have been vigorously performed (for example, refer to T. Hoshida et al., "Optimal 40 Gb/s Modulation Formats for Spectrally Efficient Long-Haul DWDM Systems", Journal of Lightwave Technology, Vol. 20, No. 12, pp. 1989-1996, December 2002, and O. Vassilieva et al., "Non-Linear Tolerant and Spectrally Efficient 86 Gbit/s RZ-DQPSK Format for a System Upgrade", OFC 2003, ThE7, 2003). Moreover, in addition to the above described modulation format, research and development of a phase modulation format such as Return to Zero-Differential Quadrature Phase-Shift Keying (RZ-DQPSK) modulation or CSRZ-DQPSK modulation having a characteristic of narrow spectrum (high frequency efficiency) have also been vigorously performed.

FIG. 12 is a diagram showing a configuration example of an optical transmitter and an optical receiver, which adopt a 43 Gbit/s RZ-DPSK or CSRZ-DPSK modulation format (hereinafter, referred to as (CS)RZ-DPSK modulation format). FIG. 13 is a diagram showing the state of optical power and optical phase when a (CS)RZ-DPSK modulated optical signal is transferred.

In FIG. 12, an optical transmitter 110 is for transmitting an optical signal in the 43 Gbit/s (CS)RZ-DPSK modulation format, and includes, for example, a transmission data processing section 111, a continuous wave (CW) light source 112, a phase modulator 113, and an RZ-pulsing intensity modulator 114.

Specifically, the transmission data processing section 111 has a function as a framer which frames input data, and a function as a forward error correction (FEC) encoder which adds an error-correcting code, and also has a function as a DPSK precoder which performs encoding in which difference information between a code one bit before and the current code is reflected.

The phase modulator 113 phase-modulates continuous light from the CW light source 112 in accordance with the encoding data from the transmission data processing section 111, and outputs an optical signal having constant optical intensity, but carrying information in binary optical phase, that is, a DPSK-modulated optical signal (see lower part in FIG. 13).

The RZ-pulsing intensity modulator 114 is for RZ-pulsing the optical signal from the phase modulator 113 (see upper part in FIG. 13). Particularly, an optical signal RZ-pulsed by using a clock drive signal having a frequency of the same bit rate as that of the data (43 GHz), and an amplitude of one times a driving voltage (Vπ) is referred to as an RZ-DPSK signal. Moreover, an optical signal RZ-pulsed by using a clock drive signal having a frequency of half the bit rate of the data (21.5 GHz), and an amplitude of two times the driving voltage (Vπ) is referred to as a CSRZ-DPSK signal.

An optical receiver 130 is connected to the optical transmitter 110 via a transmission path 120 and an optical repeater 121 for performing received signal processing with respect to the (CS)RZ-DPSK signal transmitted via optical repeater from the optical transmitter 110, and includes, for example, a delay interferometer 131, a photoelectric converter 132, a reproduction circuit 133, and a received data processing section 134.

Specifically, the delay interferometer 131 is formed of, for example, a Mach-Zehnder interferometer, and allows a delay component of one-bit time (23.3 ps in the configuration example of FIG. 1) for the (CS)RZ-DPSK signal, and a 0 rad phase-controlled component, to interfere (delay-interfere) with each other, and outputs the interference result as two outputs. The Mach-Zehnder interferometer is formed such that one of the branched waveguides becomes longer than the other by a propagation length corresponding to the one-bit time, and an electrode for phase-controlling the optical signal propagating in the other branched waveguide is formed.

The photoelectric converter 132 is formed from a dual-pin photo diode, which performs differential photoelectric conversion detection (balanced detection) by respectively receiving the outputs from the delay interferometer 131. The reception signal detected by the photoelectric converter 132 is appropriately amplified by an amplifier.

The reproduction circuit 133 is for extracting a data signal and a clock signal from the reception signal which has been differential photoelectric conversion-detected by the photoelectric converter 132. The received data processing section 134 is for performing signal processing such as error correction, based on the data signal and the clock signal extracted by the reproduction circuit 133.

FIG. 14 is a diagram showing a configuration example of an optical transmitter and an optical receiver, which adopt a 43 Gbit/s RZ-DQPSK or CSRZ-DQPSK modulation format (hereinafter, referred to as (CS)RZ-DQPSK modulation format). FIG. 15 is a diagram showing the state of optical power and optical phase when a (CS)RZ-DQPSK modulated optical signal is transferred. The configuration of an optical transmitter-receiver corresponding to the (CS)RZ-DQPSK modulation format is described in detail in, for example, Japanese Translation of PCT International Application, Publication No. 2004-516743, and hence only the outline thereof is described here.

In FIG. 14, an optical transmitter 210 includes, for example, a transmission data processing section 211, a 1:2 separating section (DEMUX) 212, a CW light source 213, a π/2 phase-shifter 214, two phase modulators 215A and 215B, and an RZ-pulsing intensity modulator 216.

Specifically, the transmission data processing section 211 has functions as the framer and the FEC encoder, as in the transmission data processing section 111 shown in FIG. 12, and a function as a DQPSK precoder which performs encoding in which difference information between a code one bit before and the current code is reflected.

The 1:2 separating section 212 is for separating 43 Gbit/s coded data from the transmission data processing section 211 into 21.5 Gbit/s two-sequence coded data #1 and #2.

The CW light source 213 is for outputting continuous light, and the output continuous light is separated into two, with one of the separated beams being input to the phase modulator 215A and the other being input to the phase modulator 215B via the π/2 phase shifter 214.

The phase modulator 215A modulates the continuous light from the CW light source 213 with the coded data #1 of one sequence separated by the 1:2 separating section 212, and outputs an optical signal carrying information in a binary optical phase (0 rad or π rad). To the phase modulator 215B are input beams obtained by phase-shifting the continuous light from the CW light source 213 by π/2 in the π/2 phase shifter 214, and the phase modulator 215B modulates the input beams with the coded data #2 of the other sequence separated by the 1:2 separating section 212, and outputs an optical signal carrying information in a binary optical phase (π/2 rad or 3π/2 rad). The beams modulated by the respective phase modulators 215A and 215B are multiplexed and output to the RZ-pulsing intensity modulator 216 on the subsequent stage. In other words, since the modulated beams from the respective phase modulators 215A and 215B are multiplexed, an optical signal having a constant optical intensity but carrying information in a four-valued optical phase (see lower part in FIG. 15), that is, a DQPSK-modulated optical signal is sent to the RZ-pulsing intensity modulator 216.

The RZ-pulsing intensity modulator 216 is for RZ-pulsing the DQPSK-modulated optical signal from the phase modulators 215A and 215B, as in the RZ-pulsing intensity modulator 114 shown in FIG. 12. Particularly, an optical signal RZ-pulsed by using a clock drive signal having a frequency of the same bit rate as that of the data #1 and #2, and an amplitude of one times the driving voltage (Vπ) is referred to as an RZ-DQPSK signal. Moreover, an optical signal RZ-pulsed by using a clock drive signal having a frequency of half the bit rate of the data #1 and #2 (10.75 GHz), and an amplitude of two times the driving voltage (Vπ) is referred to as a CSRZ-DQPSK signal.

Furthermore, an optical receiver 230 is connected to the optical transmitter 210 via a transmission path 220 and an optical repeater 221, for performing received signal processing with respect to the (CS)RZ-DQPSK signal transmitted via optical repeater from the optical transmitter 210, and includes, for example, a branching section 231 which branches the received optical signal into two, and further includes delay interferometers 232A and 232B, photoelectric converters 233A and 233B, and reproduction circuits 234A and 234B, respectively, on optical signal paths through which the branched optical signals propagate. Moreover, a 2:1 multiplexer 235 which multiplexes the data signals reproduced by the respective reproduction circuits 234A and 234B, and a received data processing section 236 are also provided.

Specifically, the optical signals obtained by branching the (CS)RZ-DQPSK signal transmitted through the transmission path 220 and the optical repeater 221, into two by the branching section 231 are respectively input to the respective delay interferometers 232A and 232B. The delay interferometer 232A allows a delay component of one-bit time (46.5 ps in the configuration example of FIG. 14), and a π/4 rad phase-controlled component, to interfere (delay-interfere) with each other, and outputs the interference result as two outputs. Moreover, the delay interferometer 232B allows a delay component of one-bit time, and a −π/4 rad phase-controlled component (the component the same as in the delay interferometer 232A is π/2 out of phase), to interfere (delay-interfere) with each other, and outputs the interference result as two outputs. Here, the respective delay interferometers 232A and 232B are respectively formed from a Mach-Zehnder interferometer, and the respective Mach-Zehnder interferometers are formed such that one of the branched waveguides becomes longer than the other by a propagation length corresponding to the one-bit time, and an electrode for phase-controlling the optical signal propagating in the other branched waveguide is formed.

The respective photoelectric converters 233A and 233B are formed from a dual-pin photo diode, which performs differential photoelectric conversion detection by respectively receiving the outputs from the respective photoelectric converters 233A and 233B. The reception signals detected by the respective photoelectric converters 233A and 233B are appropriately amplified by an amplifier.

The reproduction circuit 234A is for reproducing an in-phase component I relative to the clock signal and the data signal, from the received signal differential photoelectric conversion-detected in the photoelectric converter 233A. The reproduction circuit 234B is for reproducing a quadrature-phase component Q relative to the clock signal and the data signal, from the received signal differential photoelectric conversion-detected in the photoelectric converter 233B.

The in-phase component I and the quadrature-phase component Q are input to the 2:1 multiplexer 235 from the respective reproduction circuits 234A and 234B, and these components are converted to 43 Gbit/s data signals before the DQPSK modulation. The received data processing section 236 performs signal processing such as error correction based on the data signal from the 2:1 multiplexer 235.

Incidentally, the optical transmitters corresponding to a modulation format in which multivalue phase-modulated light is pulsed, such as the above described (CS) RZ-DPSK modulation format, or (CS)RZ-DQPSK modulation format (hereinafter, referred to as (CS)RZ-D(Q)PSK modulation format), both have a configuration in which a plurality of optical modulators are serially arranged. In such a modulation format using the plurality of optical modulators, there is a problem in that a change in the optical signal delay generated between the plurality of optical modulators may cause signal deterioration. As the conventional technique for dealing with this problem, for example, as shown in FIG. 16, a configuration has been proposed where phases of respective clock signals applied to a phase modulator 312 and an intensity modulator 313 sequentially connected to between a CW light source 311 and an output terminal, are compared with each other by a mixer 314, and an automatic delay compensation circuit (ADC) 315 controls the phase shift amount of a phase shifter 316 so that the phase relation between both clock signals becomes a constant value, based on the phase comparison result (for example, refer to Japanese Unexamined Patent Publication No. 2002-353896).

However, the above conventional technique is a method for directly monitoring drive signals applied to a plurality of modulators to detect a relative phase relation (delay difference), and performing feed-back control based on the detection result, and has a problem in that a delay shift in the optical level cannot be compensated, though a delay shift in the electrical level can be compensated.

Regarding the delay shift in the optical level, there is a problem in that, for example, as shown in FIG. 17, an optical propagation delay of a polarization maintaining fiber (PMF) 414 connecting between optical modulators 412 and 413 changes with temperature. FIG. 18 shows one example of a measurement result of a delay of the PMF in which a polyester elastomer is used as a fiber coating, relative to temperature change (reference temperature: 25° C.). Optical wavelength is assumed to be 1550 nm. It is seen from the measurement result shown in FIG. 18 that the delay increases with a rise in temperature.

FIG. 19 shows one example of a measurement result of a phase shift tolerance between drive signals (data/clock) of respective optical modulators on the transmission side, with respect to a system of the 43 Gbit/s RZ-DQPSK modulation format. When an allowable Q penalty is set to 0.2 dB, a phase shift tolerance width becomes 10 ps, which is a harsh value. Therefore, if a delay shift of the PMF occurs due to a temperature change as shown in FIG. 18, the delay shift due to the temperature change becomes a value which cannot be ignored, as compared with the tolerance, thereby causing signal deterioration.

Moreover, not only the temperature variant delay amount in the PMF for connecting the plurality of optical modulators, but also a temperature variant delay amount in an electronic circuit or an electric signal transmission path (for example, an electric coaxial cable) cause the signal deterioration. Furthermore, since the length of the PMF connecting the plurality of optical modulators changes according to the arrangement of the respective optical modulators and splice processing, there is another problem in that a delay shift occurs between respective drive signals. This problem cannot be solved by the conventional technique in which the delay shift between the drive signals applied to the respective optical modulators is directly monitored to perform feed-back control.

The present applicant has proposed a method in which optical spectrum of optical signals output from the optical modulators is monitored to perform feed-back control of phase shift between the drive signals based on an intensity change of a particular frequency component of the optical spectrum, with respect to optical modulators corresponding to the CS-RZ modulation format, though being different from the (CS)RZ-D(Q)PSK modulation format (for example, refer to Japanese Unexamined Patent Publication No. 2003-279912). According to the invention in the earlier application, by paying attention to the intensity change of the particular frequency component in the output light spectrum, a phase shift between signals of the driving system can be reliably detected, and the phase difference between the drive signals can be controlled so that an optimum driving condition can be stably obtained.

However, according to such a control method, the particular frequency component in the output light spectrum is extracted by using a narrow-band optical filter, to monitor the intensity change. However, if the extraction of the particular frequency component is not performed by using an optical filter having a sufficiently narrow bandwidth of a transparent band, there is a problem in that the monitoring accuracy of the intensity change decreases. For this problem, the present applicant has proposed a configuration in which an optical signal output from the optical modulator is photoelectrically converted to acquire an electrical spectrum, and a phase shift between the drive signals is determined based on an intensity change of the particular frequency component of the electrical spectrum (for example, refer to Japanese Unexamined Patent Publication No. 2004-294883). In the invention in the earlier application, for example, in the case where optical modulators on the previous stage and the post stage are driven by a 40 Gbit/s data signal and a 20 GHz clock signal, the phases of the data signal and the clock signal are feed-back controlled so that the power of the frequency component becomes maximum, by using the fact that the power of the frequency component over several GHz, centering on 25 GHz, of the electrical spectrum of the CS-RZ signal light output from the post-stage optical modulator decreases as the phase shift between the data signal and the clock signal increases.

However, the change in the electrical spectrum relative to the phase shift between drive signals corresponding to the abovementioned CS-RZ modulation format, and the change in the electrical spectrum relative to the phase shift between drive signals corresponding to the (CS)RZ-D(Q)PSK modulation format show different characteristics. Therefore, even if the control method in the invention in the earlier application is applied to the (CS)RZ-D(Q)PSK modulation format, it is difficult to effectively suppress waveform deterioration of the modulated light due to the phase shift between the drive signals. Accordingly, establishment of a new control method corresponding to the (CS)RZ-D(Q)PSK modulation format has been desired, which is considered to be promising as the next-generation modulation format excellent in the OSNR resistance and the nonlinearity resistance.

SUMMARY OF THE INVENTION

The present invention addresses the abovementioned points with an object of providing an optical transmitter which can reliably compensate a delay shift due to a temperature change or the like between drive signals relative to respective optical modulators, in a configuration including a plurality of optical modulators corresponding to the pulsed multivalued phase modulation format.

In order to achieve the above object, one aspect of the present invention is an optical transmitter comprising; a light source which generates continuous light, a first optical modulator to which is applied a drive signal corresponding to a data signal, for performing multivalued phase modulation with respect to the continuous light output from the light source, and a second optical modulator to which is applied a drive signal corresponding to a clock signal having a frequency corresponding to a bit rate of the data signal, for pulsing the optical signal having been subjected to the multivalued phase modulation in the first optical modulator, wherein the optical transmitter further comprises: an output monitor section which acquires an electrical spectrum by photoelectrically converting a part of the optical signal output from the second optical modulator, and extracts a preset frequency component excluding a frequency component corresponding to a baud rate from the electrical spectrum, to measure a power of the frequency component; and a controller which controls a relative phase of respective drive signals applied to the first and second optical modulators, so that the power measured in the output monitor section becomes a minimum.

In the optical transmitter of the above described configuration, a part of the optical signal having been subjected to multivalued phase modulation and pulsing in the first and the second optical modulators is branched by the output monitor section, and the power of the preset frequency component, excluding the frequency component corresponding to the baud rate, included in the electrical spectrum acquired by photoelectrically converting the branched beams is measured. The relative phase of respective drive signals applied to the first and the second optical modulators is then feed-back controlled by the controller so that the power becomes a minimum. As a result, even if a temperature change or the like occurs, the respective drive signals can be maintained in an optimum phase state.

Another aspect of the present invention is an optical transmitter comprising; a light source which generates continuous light, a first optical modulator to which is applied a drive signal corresponding to a data signal, for performing multivalued phase modulation with respect to the continuous light output from the light source, and a second optical modulator to which is applied a drive signal corresponding to a clock signal having a frequency corresponding to a bit rate of the data signal, for pulsing the optical signal having been subjected to the multivalued phase modulation in the first optical modulator, wherein the optical transmitter further comprises: an output monitor section which acquires an electrical spectrum by photoelectrically converting a part of the optical signal output from the second optical modulator, and extracts a low frequency component excluding a DC component from the electrical spectrum, to measure a power of the low frequency component; and a controller which controls a relative phase of respective drive signals applied to the first and the second optical modulators, so that the power measured in the output monitor section becomes a minimum.

In the optical transmitter of the above described configuration, a part of the optical signal having been subjected to multivalued phase modulation and pulsing in the first and the second optical modulators is branched by the output monitor section, the power of the low frequency component, excluding the DC component, included in the electrical spectrum acquired by photoelectrically converting the branched beams is measured, and the relative phase of respective drive signals applied to the first and the second optical modulators is then feed-back controlled by the controller so that the power becomes a minimum. As a result, even if a temperature change or the like occurs, the respective drive signals can be maintained in an optimum phase state.

Moreover, another aspect of the present invention is an optical transmitter comprising; a light source which generates continuous light, a first optical modulator to which is applied a drive signal corresponding to a data signal, for performing multivalued phase modulation with respect to the continuous light output from the light source, and a second optical modulator to which is applied a drive signal corresponding to a clock signal having a frequency corresponding to a bit rate of the data signal, for pulsing the optical signal having been subjected to the multivalued phase modulation in the first optical modulator, wherein the optical transmitter further comprises: an output monitor section which acquires an electrical spectrum by photoelectrically converting a part of the optical signal output from the second optical modulator, and extracts a frequency component including a DC component from the electrical spectrum, to measure a power of the frequency component; and a controller which controls a relative phase of respective drive signals applied to the first and the second optical modulators, so that the power measured in the output monitor section becomes a maximum.

In the optical transmitter of the above described configuration, a part of the optical signal having been subjected to multivalued phase modulation and pulsing in the first and the second optical modulators is branched by the output monitor section, the power of the low frequency component including the DC component in the electrical spectrum acquired by photoelectrically converting the branched beams is measured, and the relative phase of respective drive signals applied to the first and the second optical modulators is then feed-back controlled by the controller so that the power becomes a maximum. As a result, even if a temperature change or the like occurs, the respective drive signals can be maintained in an optimum phase state.

As described above, according to the optical transmitter of the present invention, even in the case where an optical signal having a high bit rate of 40 Gbit/s or the like is sent in the pulsed multivalued phase modulation format, an optical transmitter which can stably send high-quality optical signals without being affected by a temperature change or the like in the apparatus can be provided.

Other objects, characteristics, and advantages of the present invention will become apparent from the following description of the embodiments, in conjunction with the appended drawings.

BRIEF DESCRIPTION OF THE DRAWING

FIG. 19 is a diagram showing a measuring result of a phase shift tolerance between data and clock in a conventional system according to an RZ-DQPSK modulation format.

DESCRIPTION OF THE PREFERRED EMBODIMENTS

Hereunder is a description of a best mode for carrying out the present invention, with reference to the appended drawings. Throughout the drawings the same reference symbols denote the same or equivalent components.

Figure 1:
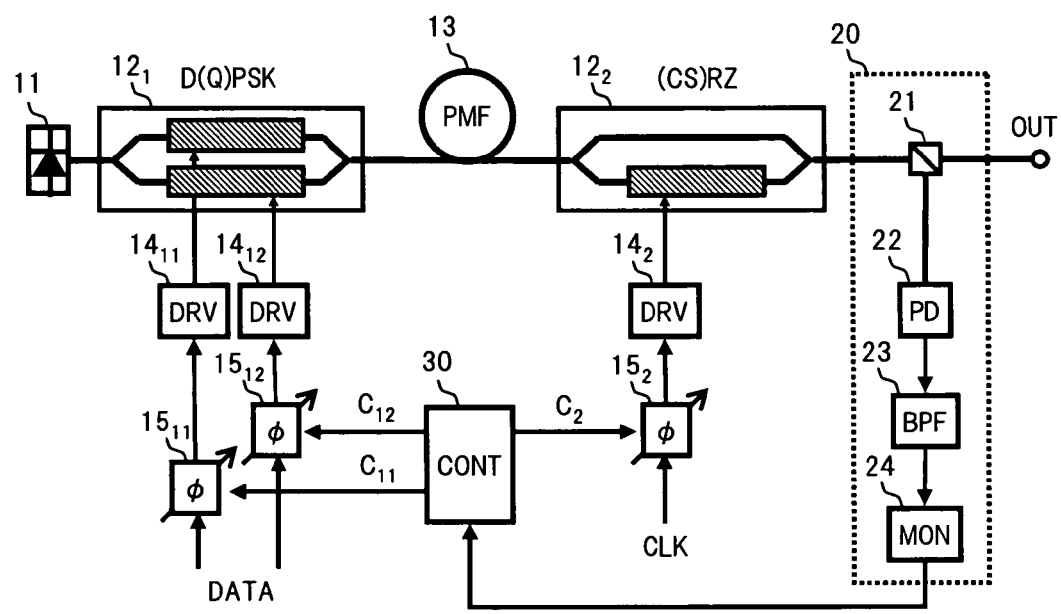
FIG. 1 is a block diagram showing a first embodiment of an optical transmitter according to the present invention.

FIG. 1 is a block diagram showing a first embodiment of an optical transmitter according to the present invention.

In FIG. 1, in the optical transmitter of the first embodiment, for example, a multivalued optical phase modulator $12_1$ serving as a first optical modulator driven according to a data signal DATA, and a (CS)RZ pulsing intensity modulator $12_2$ serving as a second optical modulator driven according to a clock signal CLK, are serially connected via a polarization maintaining optical fiber (PMF) 13 between a CW light source 11 and an output port OUT. Moreover, the optical transmitter includes an output monitor section 20 which acquires an electrical spectrum by branching a part of a (CS) RZ-D(Q)PSK-modulated optical signal output from the post-stage intensity modulator $12_2$ to the output port OUT as a monitor light, and then photoelectrically converting the monitor light, and measures a power change of a pre-set frequency component, excluding a frequency component corresponding to a baud rate, of the electrical spectrum, and a controller (CONT) 30 which determines a phase shift between the data signal DATA and the clock signal CLK based on a monitoring result of the output monitor section 20, and controls the phase of respective drive signals so that the phase shift decreases.

Figure 12:
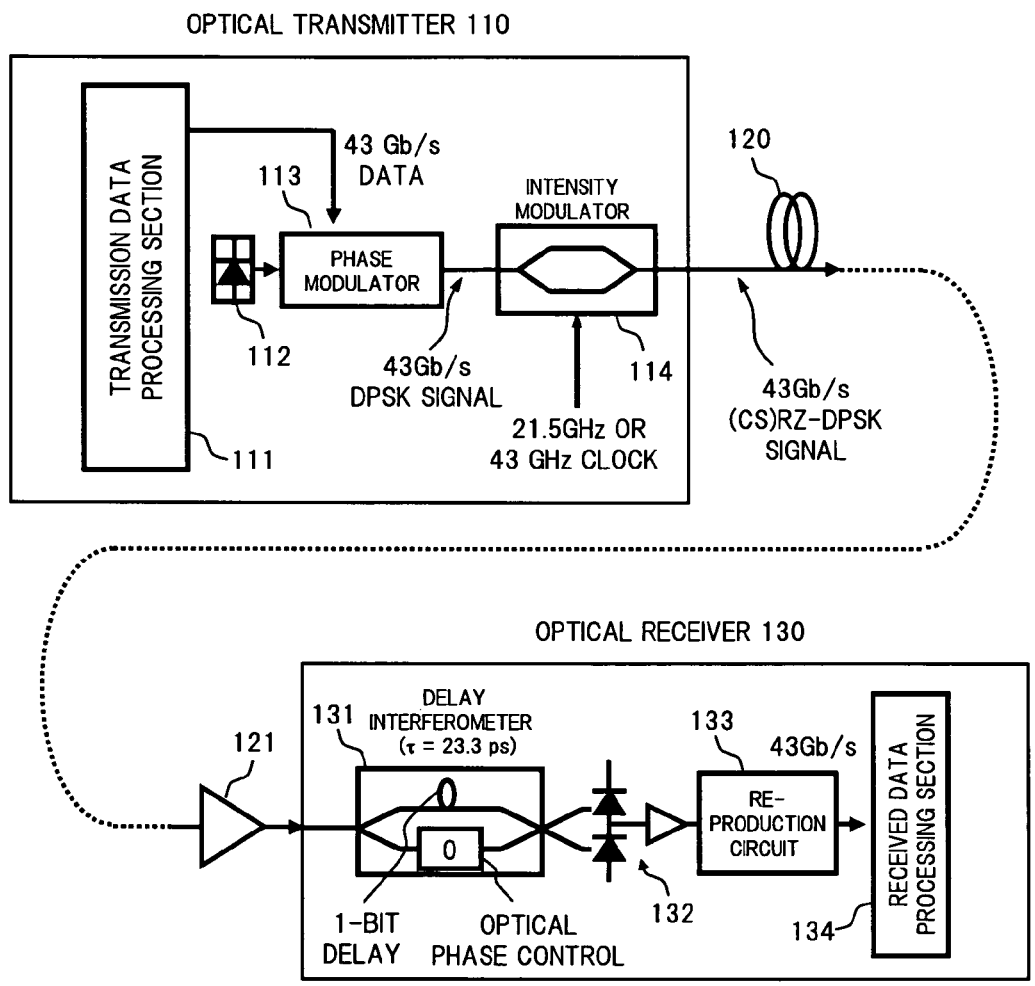
FIG. 12 is a diagram showing a configuration example of a system adopting a (CS)RZ-DPSK modulation format.
Figure 13:
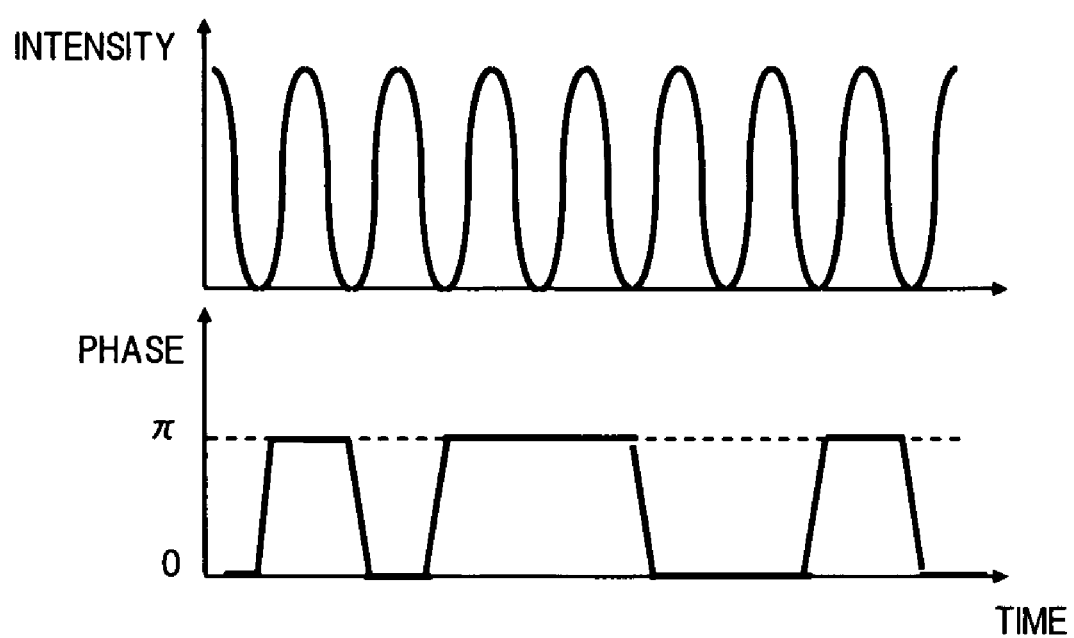
FIG. 13 is a diagram showing the state of optical power and optical phase in the system shown in FIG. 12.
Figure 14:
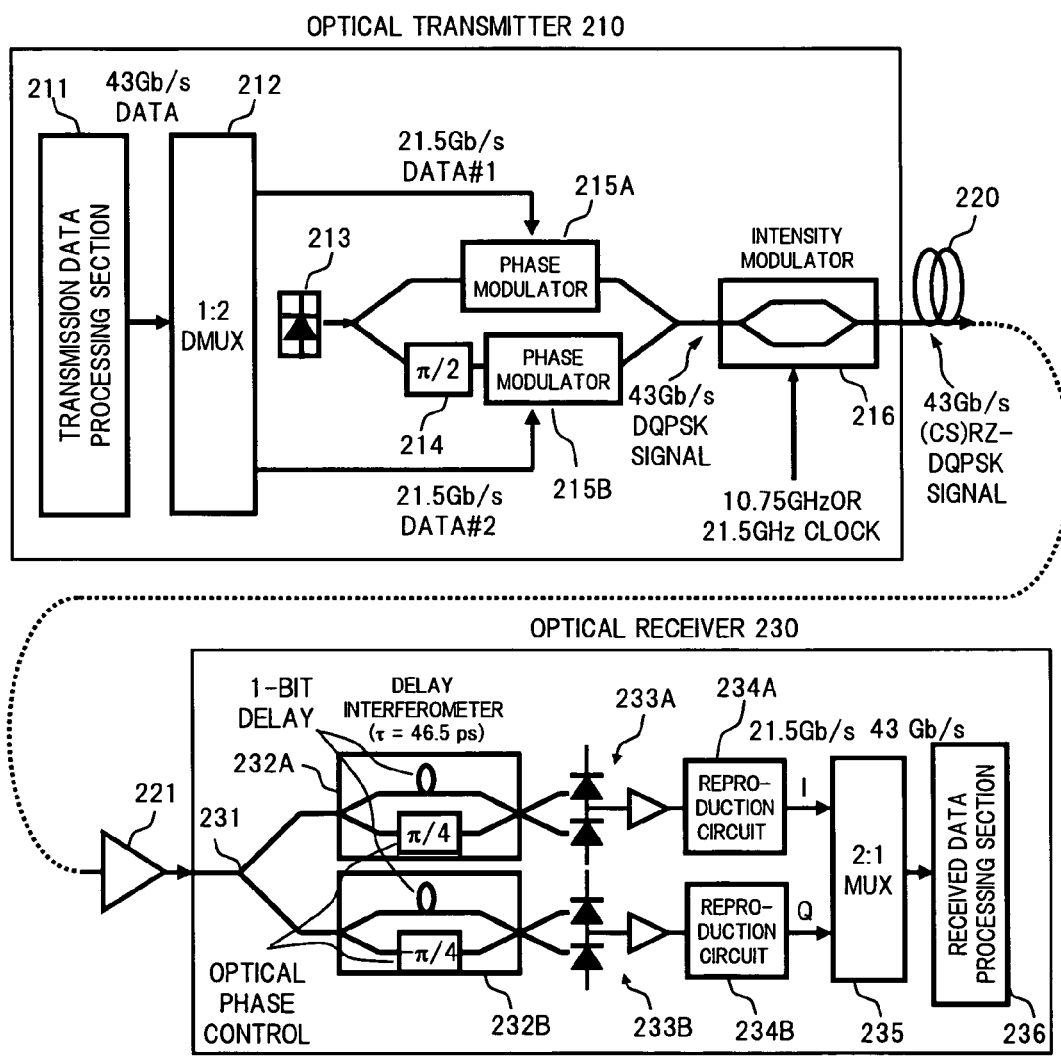
FIG. 14 is a diagram showing a configuration example of a system adopting a (CS)RZ-DQPSK modulation format.
Figure 15:
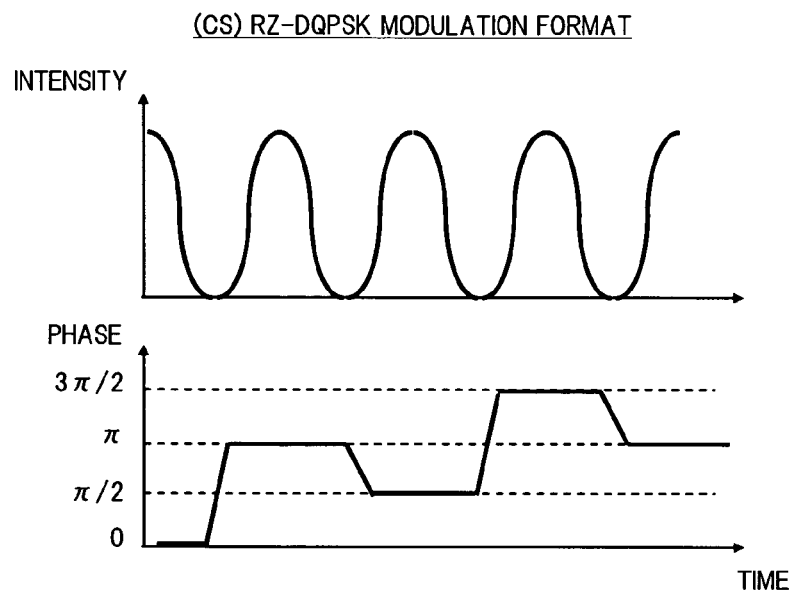
FIG. 15 is a diagram showing the state of optical power and optical phase in the system shown in FIG. 14.
Figure 16:
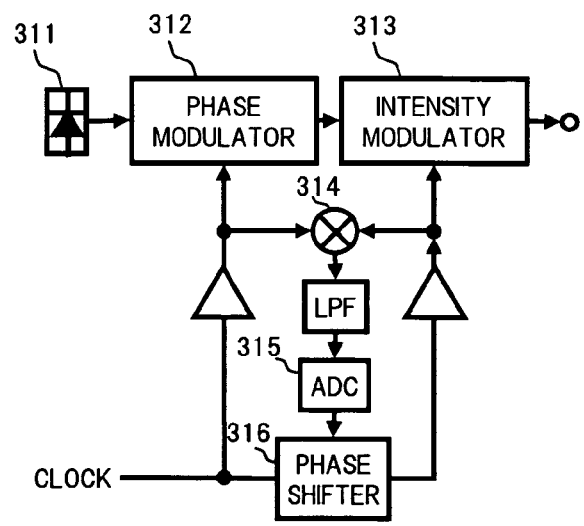
FIG. 16 is a diagram showing a configuration of a conventional optical transmitter which handles a delay shift between a plurality of optical modulators.
Figure 17:
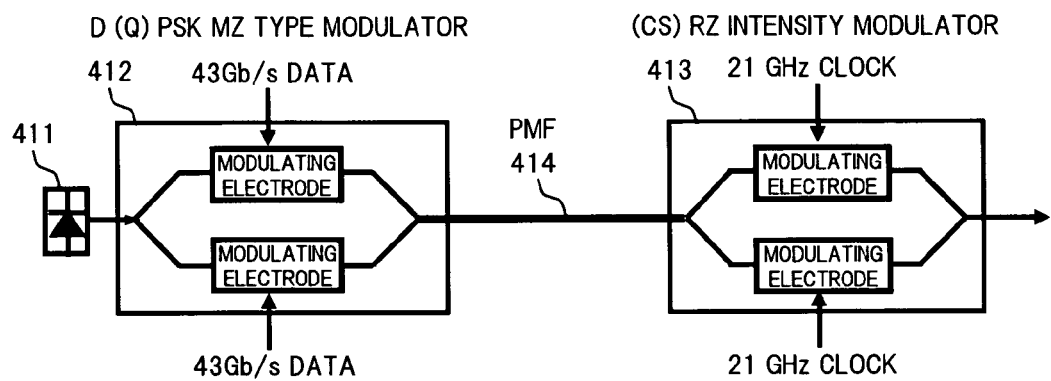
FIG. 17 is a diagram for explaining a problem in the conventional optical transmitter.
Figure 18:
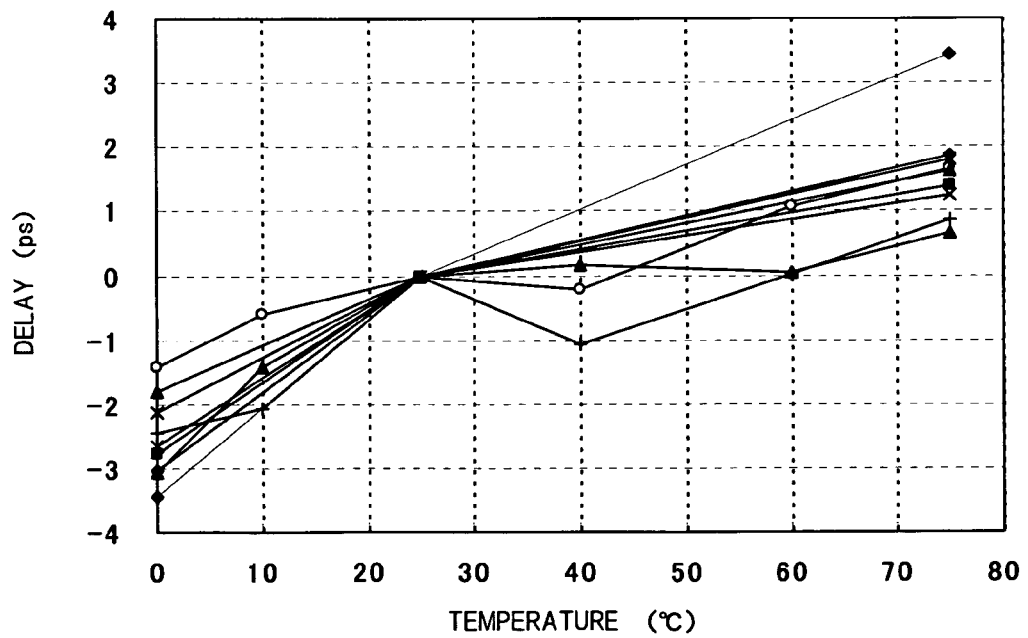
FIG. 18 is a diagram showing a temperature dependency of the delay in a PMF.

The multivalued optical phase modulator $12_1$ has, for example, a set of modulating electrodes formed above respective branching waveguides of a Mach-Zehnder interferometer, and a drive signal output from respective drive sections (DRV) $14_{11}$ and $14_{12}$ is applied respectively to each modulating electrode. The data signal DATA of, for example, 44 Gbit/s and 22 Gbit/s is input to the respective drive sections $14_{11}$ and $14_{12}$ via delay variable units (ϕ) $15_{11}$ and $15_{12}$. The data signal DATA is sent from a transmission data processing section having functions of the framer, the FEC encoder, and the D(Q)PSK precoder, though not shown, as in the conventional configuration example shown in FIG. 12 and FIG. 14.

The (CS)RZ pulsing intensity modulator $12_2$ has, for example, a modulating electrode formed above one of the branching waveguides of a Mach-Zehnder interferometer, and a drive signal output from the drive section $14_2$ is applied to the modulating electrode. A clock signal CLK of, for example, 44 GHz, 22 GHz, or 11 GHz, is input to the drive section $14_2$ via a delay variable unit $15_2$.

Respective delay variable units $15_{11}$, $15_{12}$, and $15_2$ are for providing variable delay to the signals input to the respective drive sections $14_{11}$, $14_{12}$, and $14_2$, and the delay in each unit is controlled according to respective control signals $C_{11}$, $C_{12}$, and $C_2$ generated by the controller 30 based on the monitoring result of the output monitor section 20.

The output monitor section 20 includes, for example, an optical branching coupler 21, a photodetector 22, a band-pass filter (BPF) 23, and a power monitor 24. The optical branching coupler 21 is provided between the intensity modulator 122 and the output port OUT, and branches a part of the (CS)RZ-D(Q)PSK-modulated optical signal output from the intensity modulator $12_2$ as the monitor light, and sends the monitor light to the photodetector 22. The photodetector 22 photoelectrically converts the monitor light branched by the optical branching coupler 21 to acquire the electrical spectrum. The band-pass filter 23 is a general electric filter having a passband capable of extracting a particular frequency component from the electrical spectrum acquired by the photodetector 22. The power monitor 24 measures the power of the frequency component extracted by the band-pass filter 23, and outputs the result to the controller 30.

The controller 30 generates control signals $C_{11}$, $C_{12}$, and $C_2$ for feed-back controlling the respective delays of the delay variable units $15_{11}$, $15_{12}$, and $15_2$ so that the power of the frequency component measured by the power monitor 24 becomes a minimum. The feed-back control by the controller 30 is performed based on a variation characteristics of the electrical spectrum of the (CS)RZ-D(Q)PSK signal light relative to a phase shift between the data signal DATA and the clock signal CLK as described below.

Figure 2:
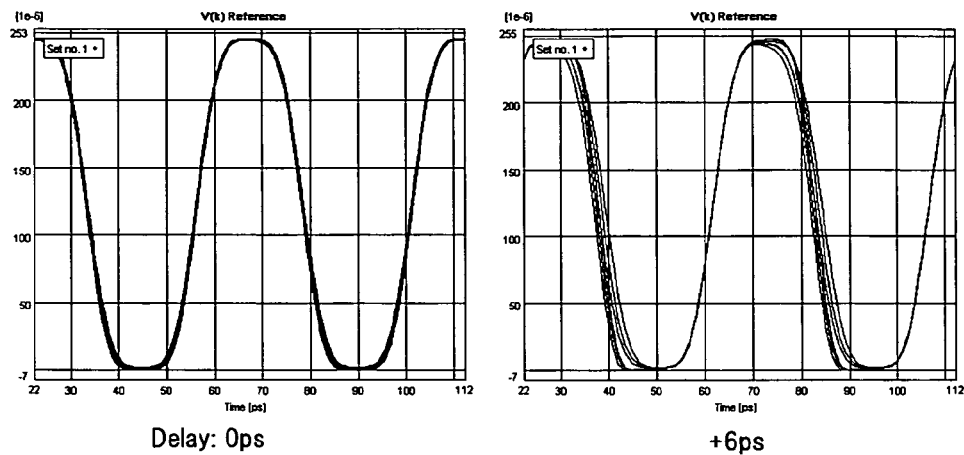
FIG. 2 is a diagram showing a calculation example of an output waveform of an RZ-DQPSK signal light relative to a phase shift in the case where a phase of a clock signal is delayed with respect to a phase of a data signal.
Figure 2:
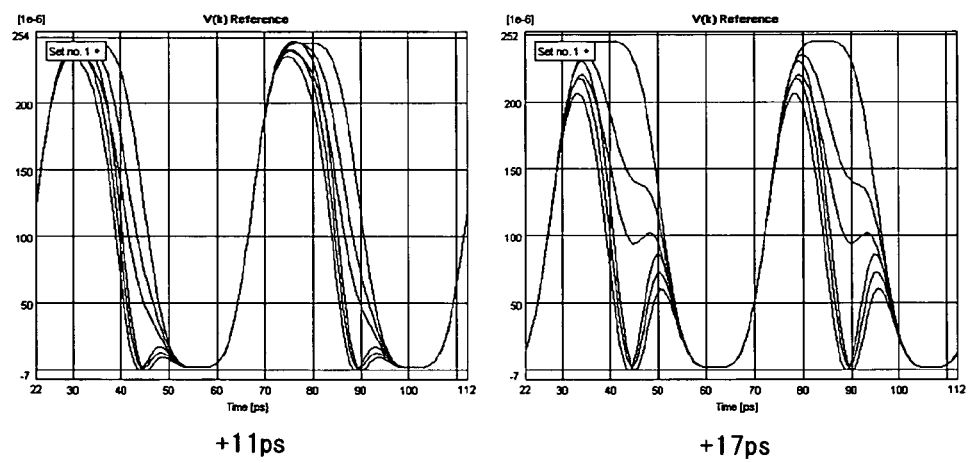
Figure 2:
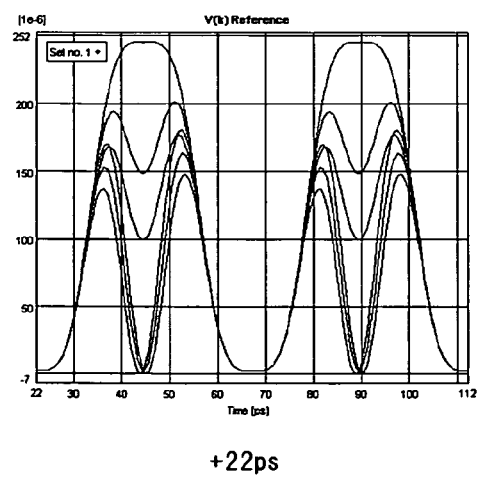
Figure 3:
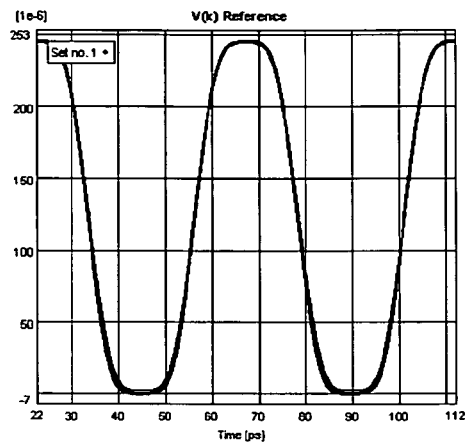
FIG. 3 is a diagram showing a calculation example of the output waveform of the RZ-DQPSK signal light relative to a phase shift in the case where the phase of the clock signal is advanced with respect to the phase of the data signal.
Figure 3:
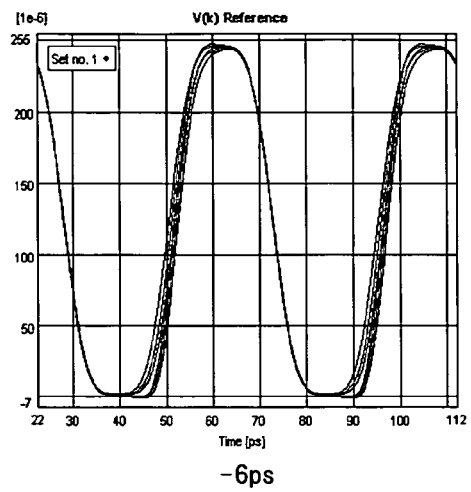
Figure 3:
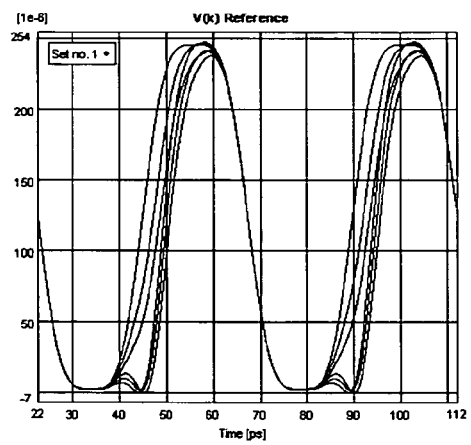
Figure 3:
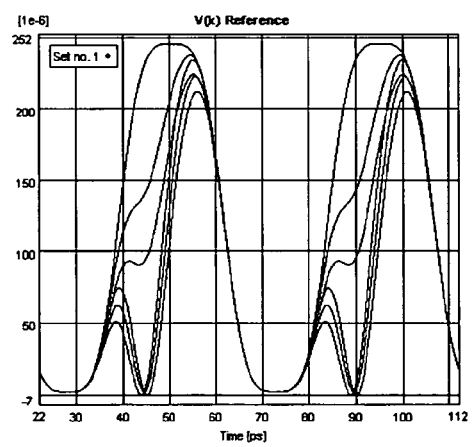
Figure 3:
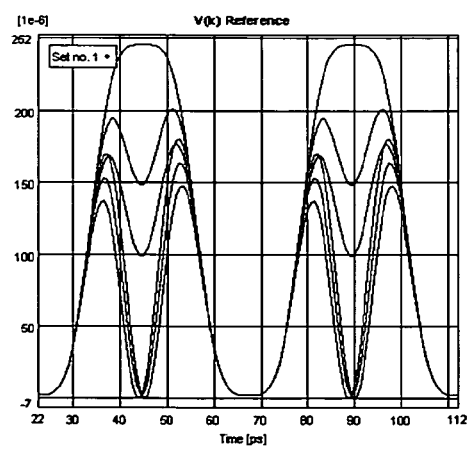
Figure 4:
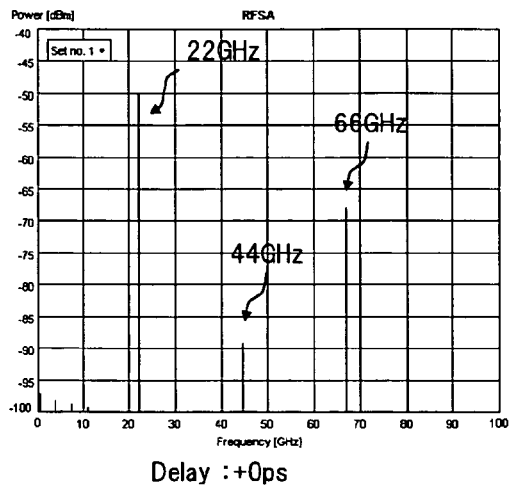
FIG. 4 is a diagram showing a calculation example of an electrical spectrum corresponding to the output waveform of FIG. 2.
Figure 4:
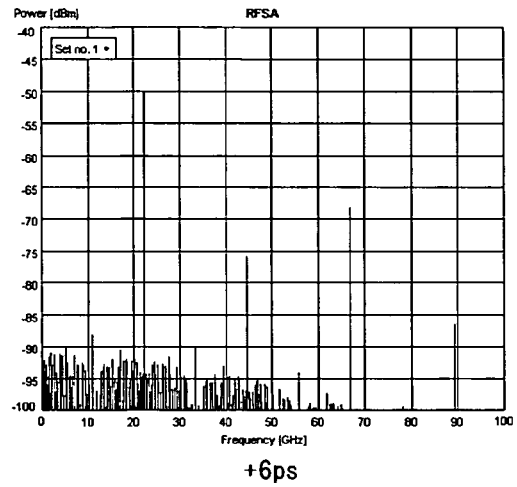
Figure 4:
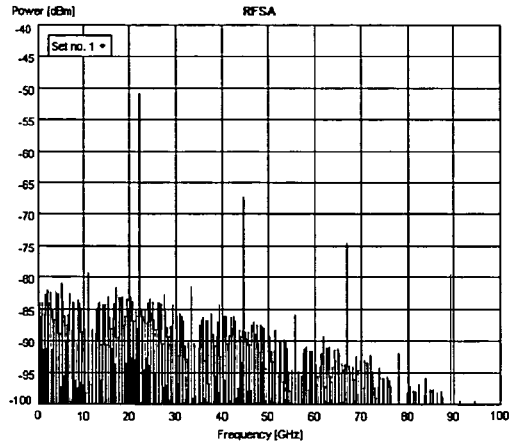
Figure 4:
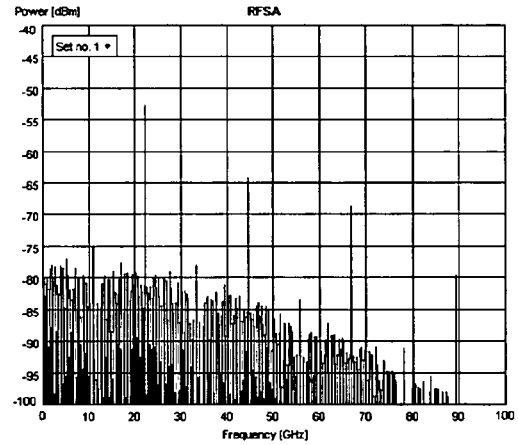
Figure 4:
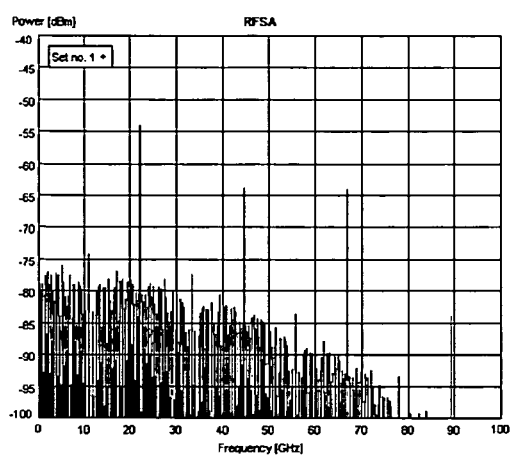
Figure 5:
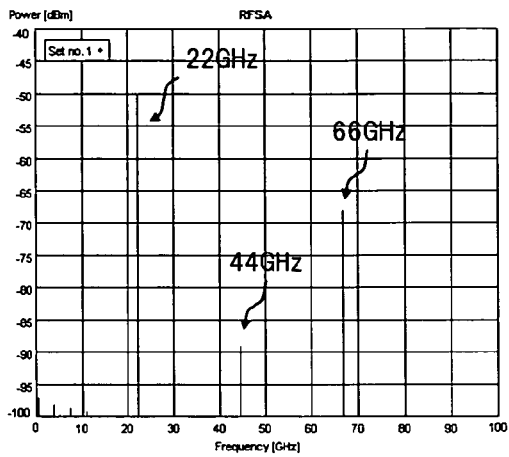
FIG. 5 is a diagram showing a calculation example of an electrical spectrum corresponding to the output waveform of FIG. 3.
Figure 5:
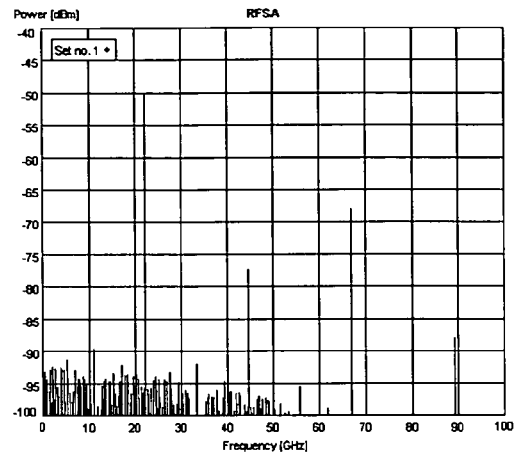
Figure 5:
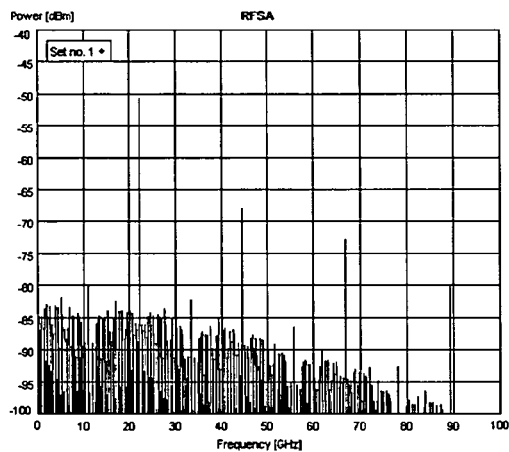
Figure 5:
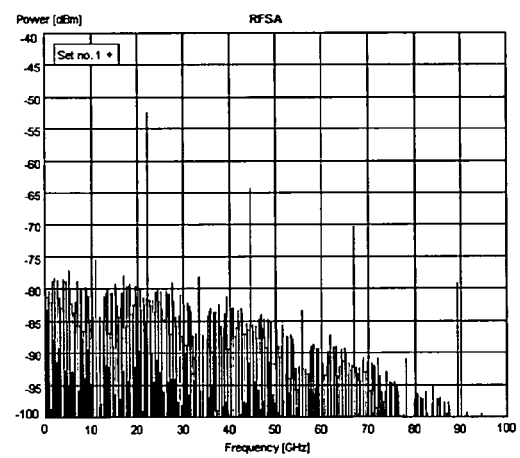
Figure 5:
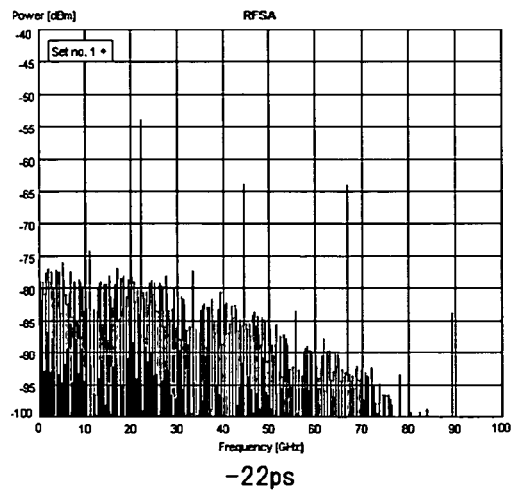

FIG. 2 and FIG. 3 are diagrams showing a calculation example of an output waveform of the RZ-DQPSK signal light relative to a phase shift (delay) between the data signal DATA and the clock signal CLK. FIG. 4 and FIG. 5 are diagrams showing a calculation example of the electrical spectrum corresponding to the respective output waveforms in FIG. 2 and FIG. 3. FIG. 2 and FIG. 4 show a case in which the phase of the clock signal CLK which drives the (CS)RZ pulsing intensity modulator $12_2$ is delayed relative to the phase of the data signal DATA which drives the multivalued optical phase modulator $12_1$, and FIG. 3 and FIG. 5 show a case in which this is advanced.

It is seen from FIG. 2 and FIG. 3 that the output waveform of the RZ-DQPSK signal light deteriorates even when a phase shift as slight as ±6 ps occurs between the data signal DATA and the clock signal CLK. At this time, it is seen from FIG. 4 and FIG. 5, that the electrical spectrum of the RZ-DQPSK signal light, exhibits a characteristic where the power of the 22 GHz component decreases, and the power of other frequency components increases, with an increase of the phase shift between the data signal DATA and the clock signal CLK. Therefore, in the first embodiment, by paying attention, for example, to the 44 GHz frequency component of the electrical spectrum of the RZ-DQPSK signal light, an occurrence state of phase shift between the data signal DATA and the clock signal CLK is determined based on the power change of the 44 GHz component.

Figure 6:
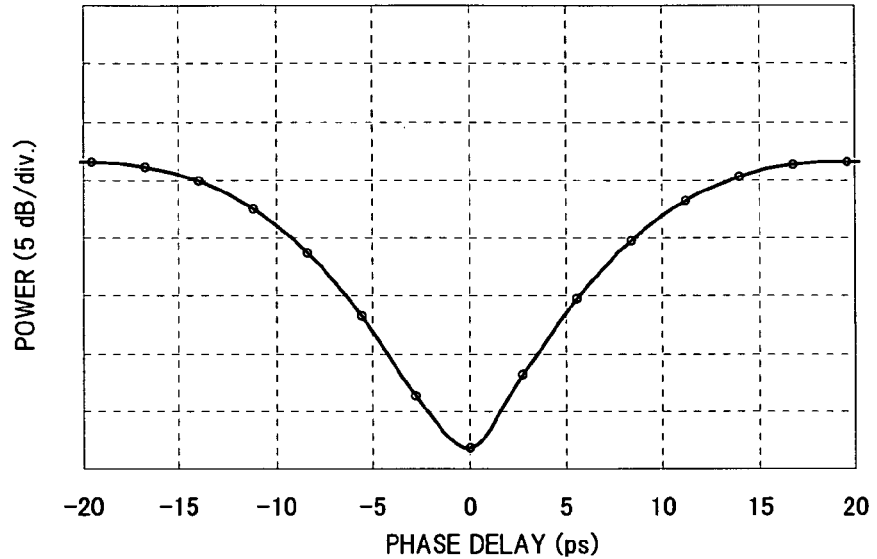
FIG. 6 is a diagram showing an example in which a power change near 44 GHz with respect to a phase shift between the data signal and the clock signal is calculated.

FIG. 6 shows an example in which a power change near 44 GHz relative to a phase shift between the data signal DATA and the clock signal CLK is calculated. As is apparent from FIG. 6, when the phase delay is 0 ps, the power near 44 GHz becomes a minimum, and the power near 44 GHz increases with an increase of the phase delay. In other words, in the configuration shown in FIG. 1, with regard to the electrical spectrum acquired by photoelectrically converting the light signal output from the intensity modulator $12_2$ on the post stage, an optimum phase state in which the phase delay is substantially 0 ps can be maintained by monitoring the power of the 44 GHz component and feed-back controlling the relative phase of the data signal DATA and the clock signal CLK so that the power becomes a minimum.

Figure 7:
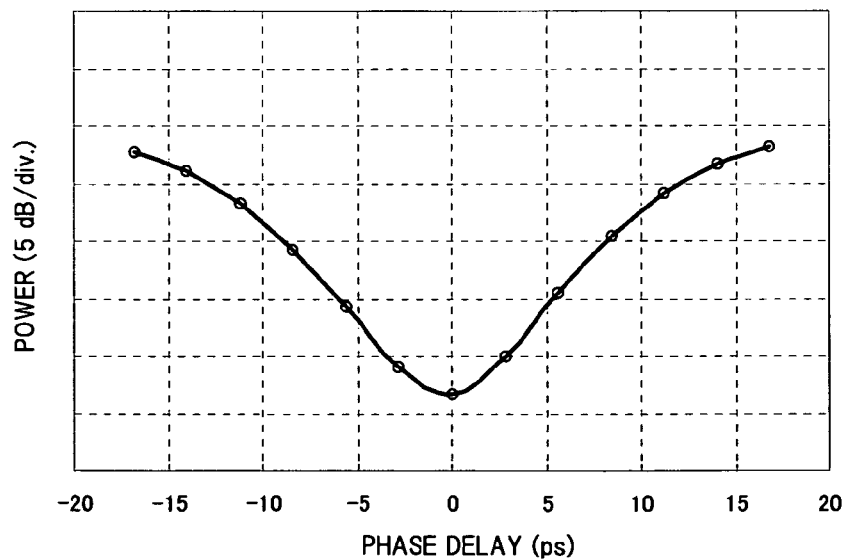
FIG. 7 is a diagram showing an example in which a power change near 100 MHz with respect to a phase shift between the data signal and the clock signal is calculated.

Here the example in which attention is paid to the power change near 44 GHz included in the electrical spectrum is shown, but as is apparent from the electrical spectrum shown in FIG. 4 and FIG. 5, the power of an optional frequency component excluding the 22 GHz component also becomes a minimum when the phase delay is 0 ps. Since the 22 GHz component corresponds to the baud rate, in the present invention, the power change of the preset frequency component excluding the frequency component corresponding to the baud rate may be monitored, so as to feed-back control the relative phase of the data signal DATA and the clock signal CLK so that the power becomes a minimum. As a specific example, FIG. 7 shows a power change with respect to the phase delay in the case where a band-pass filter whose center frequency is set to 100 MHz is used.

According to the first embodiment as described above, in the configuration including the multivalued optical phase modulator $12_1$ and the (CS)RZ pulsing intensity modulator $12_2$ corresponding to the (CS)RZ-D(Q)PSK modulation format, with regard to the electrical spectrum acquired by photoelectrically converting the output light from the post-stage intensity modulator $12_2$, a particular frequency component excluding the frequency component corresponding to the baud rate is extracted by the band-pass filter 23, to monitor the power change, and the relative phase of the data signal DATA and the clock signal CLK is feed-back controlled so that the power becomes a minimum. As a result, a phase shift due to temperature changes or the like can be reliably compensated, and the (CS)RZ-D(Q)PSK signal light can be generated under a stable driving condition.

Next is a description of a second embodiment of the present invention.

Figure 8:
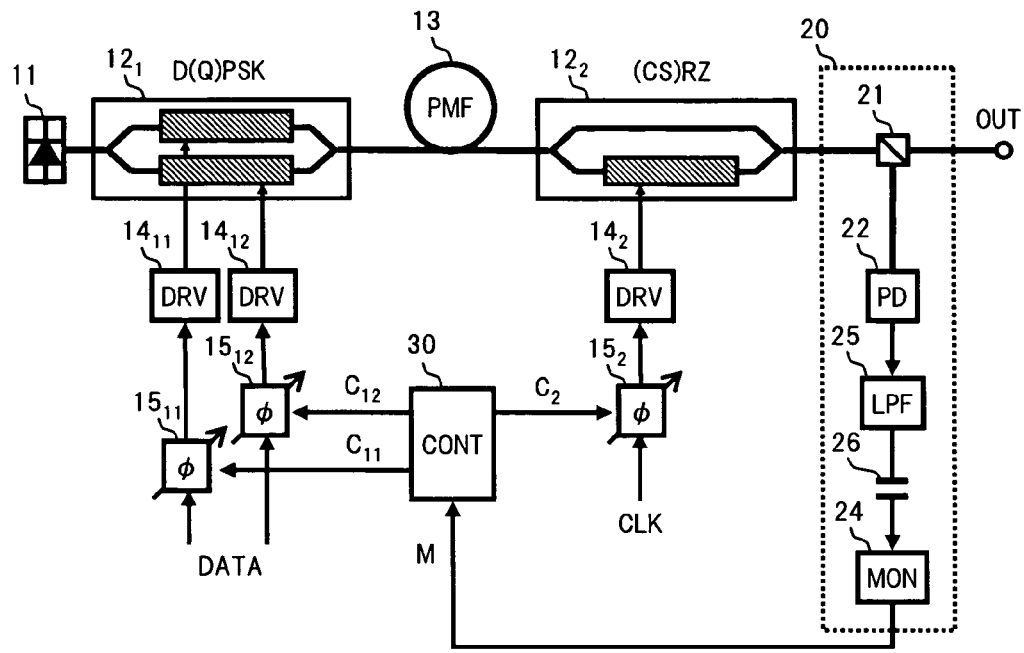
FIG. 8 is a block diagram showing a second embodiment of an optical transmitter according to the present invention.

FIG. 8 is a block diagram showing the second embodiment of the optical transmitter according to the present invention.

In FIG. 8, the point where the configuration of the optical transmitter in the second embodiment is different from the case of the first embodiment shown in FIG. 1 is that a low-pass filter (LPF) 25 and a capacitor 26 are provided between the photodetector 22 and the power monitor 24, instead of the band-pass filter 23 in the output monitor section 20. The low-pass filter 25 is an electric filter in which a cutoff frequency is set on the lower frequency side than the vicinity of 22 GHz, for example, relative to the 44 GHz (CS)RZ-D(Q) PSK signal light. Here 10 MHz is assumed as a preferable setting example of the cutoff frequency. However, the cutoff frequency of the low-pass filter 25 in the present invention is not limited to the above specific example. The capacitor 26 intercepts the DC component of the electric signal having passed the low-pass filter 25, extracts the AC component, and transmits the AC component to the power monitor 24. Here, as an example, the capacitor 26 is arranged between the low-pass filter 25 and the power monitor 24, but the capacitor 26 may be arranged between the photodetector 22 and the low-pass filter 25.

Figure 9:
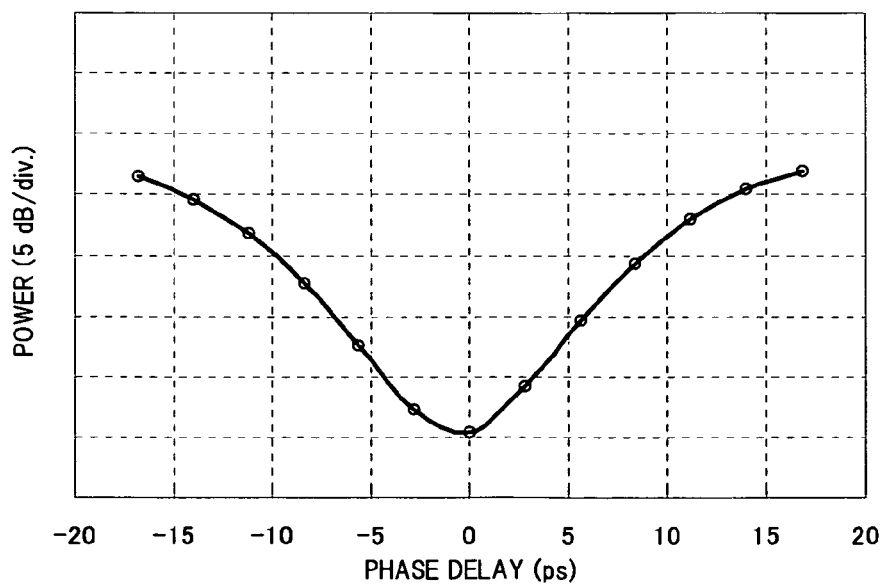
FIG. 9 is a diagram showing an example in which a relation between the power monitored and a phase delay is calculated in the case where a low-pass filter having a cutoff frequency of 10 MHz and a capacitor for removing DC components are applied.

FIG. 9 is a diagram showing an example in which a relation between the power of a monitoring signal measured by a power monitor 24, and a phase delay, is calculated for a case where a low-pass filter 25 having a cutoff frequency of 10 MHz and a capacitor 26 are applied. Thus, it is seen that in the case where the low-pass filter 25 and the capacitor 26 are applied, the power measured by the power monitor 24 increases with an increase of the phase delay. In other words, in the case where the low-pass filter 25 and the capacitor 26 are applied, an optimum phase state in which the phase delay is substantially 0 ps can be maintained by feed-back controlling the relative phase of the data signal DATA and the clock signal CLK so that the power measured by the power monitor 24 becomes a minimum.

Assuming that the power monitor 24 used here measures the power including both the DC component and the AC component of the input electric signal, the capacitor 26 is provided on the previous stage of the power monitor 24. However, in the case where a power monitor having a function for removing the DC component of the input electric signal to measure only the AC component is used, monitoring information having a trend shown in FIG. 9 can be acquired even if the capacitor 26 shown in FIG. 8 is omitted.

Moreover, for example, in the case where the cutoff frequency of the photodetector 22 is set on the lower frequency side than the vicinity of 22 GHz relative to the 44 GHz (CS)RZ-D(Q)PSK signal light, the low-pass filter 25 shown in FIG. 8 may be omitted, and the power of the AC component in a low frequency region is monitored by the power monitor 24, thereby to perform the same control as in the above.

According to the second embodiment as described above, with regard to the electrical spectrum acquired by photoelectrically converting the output light from the post-stage intensity modulator $12_2$, a low frequency component is extracted by using the low-pass filter 25, to monitor the power change of the AC component, and the relative phase of the data signal DATA and the clock signal CLK is feed-back controlled so that the power becomes a minimum. As a result, a phase shift due to temperature change or the like can be reliably compensated, and the (CS)RZ-D (Q) PSK signal light can be generated under a stable driving condition. Moreover, since the power change of the low-frequency component can be monitored by using an inexpensive and low-speed device, the cost of the optical transmitter can also be reduced.

In the first and second embodiments, the (CS)RZ-DPSK modulation format in which two-valued phase-modulated light is pulsed, and the (CS)RZ-DQPSK modulation format in which four-valued phase-modulated light is pulsed have been explained. However, the present invention is also applicable to a modulation format in which a multi-valued phase-modulated light other than two-valued and four-valued phase-modulated light is pulsed, as in the respective embodiments.

Next is a description of a third embodiment of the present invention.

Figure 10:
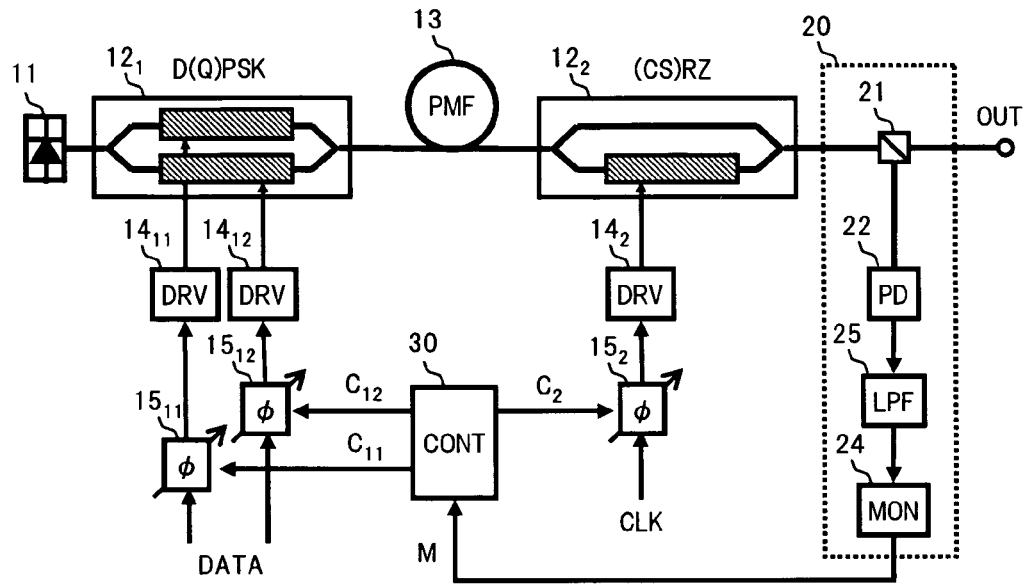
FIG. 10 is a block diagram showing a third embodiment of an optical transmitter according to the present invention.

In FIG. 10, the point where the configuration of the optical transmitter in the third embodiment is different from the case of the first embodiment shown in FIG. 1 is that the low-pass filter (LPF) 25 is provided between the photodetector 22 and the power monitor 24, instead of the band-pass filter 23 in the output monitor section 20. The low-pass filter 25 is an electric filter in which a cutoff frequency is set on the lower frequency side than the vicinity of 22 GHz, for example, relative to the 44 GHz (CS)RZ-D(Q)PSK signal light. Here 10 MHz is assumed as a preferable setting example of the cutoff frequency. However, the cutoff frequency of the low-pass filter 25 in the present invention is not limited to the specific example. The power monitor 24 used here measures the power including both the DC component and the AC component of the input electric signal.

Figure 11:
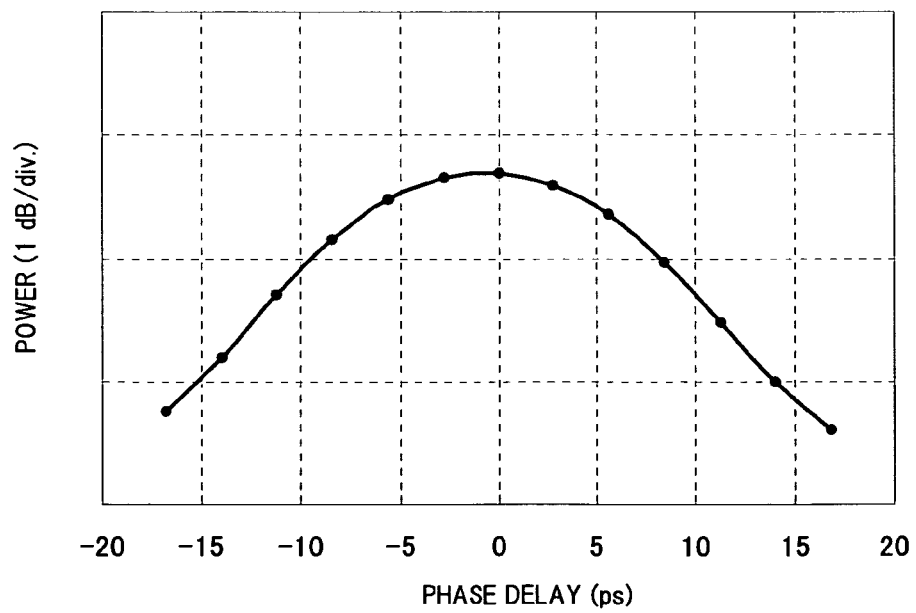
FIG. 11 is a diagram showing an example in which a relation between the power monitored and the phase delay amount is calculated in the case where a low-pass filter having a cutoff frequency of 10 MHz is applied.

FIG. 11 is a diagram showing an example in which a relation between the power of the monitoring signal measured by the power monitor 24 and the phase delay is calculated for the case where the low-pass filter 25 having a cutoff frequency of 10 MHz is applied. It is seen that in the case where the low-pass filter 25 is applied, the power measured by the power monitor 24 decreases with an increase of the phase delay. In the case where only the low-pass filter 25 is applied to monitor the power of the DC component and the AC component, without intercepting the DC component by using the capacitor 26 as in the second embodiment, since the power of the DC component is considerably larger than the power of the AC component, the power change of the DC component becomes predominant as the change of the monitored power relative to the phase delay. As is obvious from a difference of scale of the Y axis in each graph shown in FIG. 9 and FIG. 11, the power change of the DC component relative to the phase delay becomes smaller than the power change of the AC component, but still it can be used for the feed-back control of the phase delay. In other words, an optimum phase state in which the phase delay is substantially 0 ps can be maintained by feed-back controlling the relative phase of the data signal DATA and the clock signal CLK so that the power measured by the power monitor 24 becomes a maximum.

According to the third embodiment as described above, with regard to the electrical spectrum acquired by photoelectrically converting the output light from the post-stage intensity modulator $12_2$, a low frequency component is extracted by using the low-pass filter 25, to monitor the power change including the DC component, and the relative phase of the data signal DATA and the clock signal CLK is feed-back controlled so that the power becomes a maximum. As a result, a phase shift due to temperature changes or the like can be reliably compensated, and the (CS)RZ-D (Q)PSK signal light can be generated under a stable driving condition. Since the power change of the low-frequency component can be monitored by using an inexpensive and low-speed device, the cost of the optical transmitter can also be reduced.

In the third embodiment, the power of the component from the DC component to the cutoff frequency of the low-pass filter 25 is monitored to perform feed-back control. However, even if only the DC component of the electric signal output from the photodetector 22 is extracted and its power monitored, it is possible to perform feed-back control similar to that of the third embodiment.

The invention claimed is:

1. An optical transmitter comprising:
a light source which generates continuous light,
a first optical modulator to which is applied a drive signal corresponding to a data signal, for performing multivalued phase modulation with respect to the continuous light output from said light source, and
a second optical modulator to which is applied a drive signal corresponding to a clock signal having a frequency corresponding to a bit rate of said data signal, for pulsing the optical signal having been subjected to the multivalued phase modulation in said first optical modulator, wherein
said optical transmitter further comprises:
an output monitor section which acquires an electrical spectrum by photoelectrically converting a part of the optical signal output from said second optical modulator, and extracts a low frequency component excluding a direct current component from said electrical spectrum by a low pass filter, to measure a power of said low frequency component; and
a controller which controls a relative phase of respective drive signals applied to said first and second optical modulators, so that the power measured in said output monitor section becomes a minimum.

2. An optical transmitter according to claim 1, wherein said output monitor section comprises:
an optical branching coupler which branches a part of the optical signal output from said second optical modulator;
a photodetector which converts the light branched by said optical branching coupler into an electrical signal;
said low pass filter to which is input an electrical signal from said photodetector, and which has a cutoff frequency set to a frequency lower than a frequency corresponding to ½ of the bit rate of said data signal,
a capacitor which intercepts a direct current component of an electric signal having passed through said low pass filter, and extracts an alternating current component, and
a power monitor which measures the power of the alternating current component extracted by said capacitor.

3. An optical transmitter according to claim 1, wherein said output monitor section comprises:
an optical branching coupler which branches a part of the optical signal output from said second optical modulator;
a photodetector which converts the light branched by said optical branching coupler into an electrical signal;

a capacitor which intercepts a direct current component of an electric signal from said photodetector, and extracts an alternating current component,
said low pass filter to which is input an alternating current component extracted by said capacitor, and which has a cutoff frequency set to a frequency lower than a frequency corresponding to ½ of the bit rate of said data signal, and
a power monitor which measures the power of the low frequency component which has passed through said low pass filter.

4. An optical transmitter according to claim 1, wherein said first optical modulator two-value phase modulates the continuous light output from said light source.

5. An optical transmitter according to claim 1, wherein said first optical modulator four-value phase modulates the continuous light output from said light source.

6. An optical transmitter according to claim 1, wherein said second optical modulator has a frequency the same as that of the bit rate of said data signal, and on application of a drive signal corresponding to a clock signal having an amplitude of one times a driving voltage, pulses the signal light which has been multivalue phase modulated in said first optical modulator.

7. An optical transmitter according to claim 1, wherein said second optical modulator has a frequency of ½ of the bit rate of said data signal, and on application of a drive signal corresponding to a clock signal having an amplitude of two times a driving voltage, pulses the signal light which has been multivalue phase modulated in said first optical modulator.

8. An optical transmitter comprising:
a light source which generates continuous light,
a first optical modulator to which is applied a drive signal corresponding to a data signal, for performing multivalued phase modulation with respect to the continuous light output from said light source, and
a second optical modulator to which is applied a drive signal corresponding to a clock signal having a frequency corresponding to a bit rate of said data signal, for pulsing the optical signal having been subjected to the multivalued phase modulation in said first optical modulator, wherein
said optical transmitter further comprises:
an output monitor section which acquires an electrical spectrum by photoelectrically converting a part of the optical signal output from said second optical modulator, and extracts a frequency component including a direct current component from said electrical spectrum, to measure a power of said frequency component; and
a controller which controls a relative phase of respective drive signals applied to said first and second optical modulators, so that the power measured in said output monitor section becomes a maximum.

9. An optical transmitter according to claim 8, wherein said output monitor section comprises:
an optical branching coupler which branches a part of the optical signal output from said second optical modulator;
a photodetector which converts the light branched by said optical branching coupler into an electrical signal;
a low pass filter to which is input an electrical signal from said photodetector, and which has a cutoff frequency set to a frequency lower than a frequency corresponding to ½ of the bit rate of said data signal, and a power monitor which measures the power of the low frequency component including the direct current component which has passed through said low pass filter.

10. An optical transmitter according to claim 8, wherein said first optical modulator two-value phase modulates the continuous light output from said light source.

11. An optical transmitter according to claim 8, wherein said first optical modulator four-value phase modulates the continuous light output from said light source.

12. An optical transmitter according to claim 8, wherein said second optical modulator has a frequency the same as that of the bit rate of said data signal, and on application of a drive signal corresponding to a clock signal having an amplitude of one times a driving voltage, pulses the signal light which has been multivalue phase modulated in said first optical modulator.

13. An optical transmitter according to claim 8, wherein said second optical modulator has a frequency of ½ of the bit rate of said data signal, and on application of a drive signal corresponding to a clock signal having an amplitude of two times a driving voltage, pulses the signal light which has been multivalue phase modulated in said first optical modulator.

* * * * *